(12) United States Patent
St. Germain, Jr. et al.

(10) Patent No.: US 9,145,984 B2
(45) Date of Patent: Sep. 29, 2015

(54) HIGH STRENGTH, HIGH TEMPERATURE RESISTANT ROUNDSLING FOR USE AS A PIPELINE RESTRAINING DEVICE

(71) Applicant: Slingmax, Inc., Aston, PA (US)

(72) Inventors: Dennis A. St. Germain, Jr., Greensboro, NC (US); Scott St. Germain, Garnet Valley, PA (US)

(73) Assignee: SlingMax, Inc., Aston, PA (US)

( * ) Notice: Subject to any disclaimer, the term of this patent is extended or adjusted under 35 U.S.C. 154(b) by 247 days.

(21) Appl. No.: 13/828,080

(22) Filed: Mar. 14, 2013

(65) Prior Publication Data
US 2013/0319565 A1    Dec. 5, 2013

Related U.S. Application Data

(60) Provisional application No. 61/653,009, filed on May 30, 2012.

(51) Int. Cl.
| | | |
|---|---|---|
| *F16L 3/04* | (2006.01) | |
| *D02G 3/04* | (2006.01) | |
| *F16L 57/00* | (2006.01) | |
| *F16L 55/00* | (2006.01) | |
| *D07B 1/02* | (2006.01) | |
| *D07B 7/16* | (2006.01) | |

(52) U.S. Cl.
CPC . *F16L 3/04* (2013.01); *D02G 3/047* (2013.01); *F16L 55/005* (2013.01); *F16L 57/00* (2013.01); *D07B 1/025* (2013.01); *D07B 7/165* (2013.01); *D07B 2201/2036* (2013.01); *D07B 2205/205* (2013.01); *D07B 2205/2042* (2013.01);
(Continued)

(58) Field of Classification Search
CPC ........... F16L 3/04; F16L 57/00; F16L 55/005; D02G 3/047; D07B 1/025; D07B 7/165; D07B 7/2201; D07B 7/2036; D07B 2205/2042; D07B 2205/205; D07B 2401/2035; D07B 2401/2055
USPC ............. 138/106; 294/74; 442/181; 137/377; 285/117; 57/252
See application file for complete search history.

(56) References Cited

U.S. PATENT DOCUMENTS

| | | |
|---|---|---|
| 5,651,572 A | 7/1997 | St. Germain |
| 6,481,457 B2 | 11/2002 | Hayes et al. |

(Continued)

OTHER PUBLICATIONS

Chapter 9-6 "Synthetic Roundslings: Selection, Use and Maintenance" of The American Society of Mechanical Engineers ASME B30.9-2010 (Revision of ASME B30.9-2006) Slings—Safety Standard for Cableways, Cranes, Derricks, Hoists, Hooks, Jacks, and Slings brochure, Copyright 2010.

*Primary Examiner* — Kevin P Shaver
*Assistant Examiner* — Robert Nichols, II
(74) *Attorney, Agent, or Firm* — Panitch Schwarze Belisario & Nadel LLP

(57) ABSTRACT

A high strength, high temperature resistant roundsling for use as a restraint safety device. The roundsling uses a blend of fibers having characteristics of high strength, improved heat resistance, low weight, and improved handibility, as compared to roundslings assembled from non-blended fibers. Use of the roundslings of the present invention to secure sections of pipeline systems, will assist to maintain safety and reduce failure conditions in such pipeline systems that are subject to higher pressures and elevated temperatures. An exemplary and preferred range of the fiber blend for the inventive roundsling device are within a range of 30-70% Para-Aramid fibers and 70-30% LCP fibers, respectively. An exemplary embodiment of the present invention that has been tested is a roundsling manufactured to include a blend of fibers within the approximate range of 55-65% Para-Aramid and 45-35% LCP.

10 Claims, 1 Drawing Sheet

(52) U.S. Cl.
CPC ... *D07B2401/207* (2013.01); *D07B 2401/2035* (2013.01); *D07B 2401/2055* (2013.01)

(56) References Cited

U.S. PATENT DOCUMENTS

| | | |
|---|---|---|
| 7,568,333 B2 | 8/2009 | St. Germain |
| 7,661,737 B2 | 2/2010 | St. Germain |
| 7,908,955 B1 | 3/2011 | Chou et al. |
| 7,926,859 B2 | 4/2011 | St. Germain |
| 8,109,072 B2 | 2/2012 | Chou et al. |
| 8,322,765 B2 | 12/2012 | St. Germain |
| 2007/0079695 A1 | 4/2007 | Bucher et al. |
| 2009/0051181 A1* | 2/2009 | Goossens et al. ............... 294/74 |
| 2012/0061980 A1* | 3/2012 | Mamie et al. ................... 294/74 |
| 2012/0112482 A1* | 5/2012 | Babinchak ...................... 294/74 |
| 2014/0178615 A1* | 6/2014 | Broadway et al. ........... 428/35.5 |

* cited by examiner

HIGH STRENGTH, HIGH TEMPERATURE RESISTANT ROUNDSLING FOR USE AS A PIPELINE RESTRAINING DEVICE

CROSS-REFERENCE TO RELATED APPLICATIONS

This application claims the benefit of priority under 35 U.S.C. §119(e) to earlier filed U.S. patent application Ser. No. 61/653,009, filed on May 30, 2012, the disclosure of which is incorporated herein by reference in its entirety.

FIELD OF THE INVENTION

The present invention relates generally to roundslings, the fibers and strands used to manufacture such roundslings, and the manufacturing process for such roundslings. More particularly, the present invention relates to high strength, high temperature resistant roundslings that may be used as a restraint safety device in or with petroleum pipeline systems. In particular preferred embodiments, the present invention relates to the use of a blend or composite of high strength and high temperature resistant fibers assembled to create a roundsling that exhibits higher strength, improved heat resistance, lower weight, and improved handibility characteristics as compared to roundslings assembled from non-blended fibers.

BACKGROUND OF THE INVENTION

In oil and gas pipeline systems, it is often necessary to heat the material or fluid being transported through the pipeline, or to heat certain sections of the pipeline, in order to assist in the transmission of the material fluid through the pipeline. In addition to the potential higher heat conditions, the material and fluids being transmitted through these types of pipelines may be under high pressure conditions. Such pipelines have inherent "weak links" at juncture locations, including at any bends or elbows including in the pipeline system. Moreover, it is known that at such pipeline system bends, or elbows, stresses tend to be higher, and weaknesses may develop over time due to natural system usage and wear and tear. Due to the potential higher system pressures, and higher material temperatures, if a failure in the pipeline structure occurs, such failures could be dangerous to personnel or equipment located near any failure point. Manufacturers and operators of such pipeline systems have incorporated and used various safety designs and precautions to minimize damage or injuries that may occur should a system failure occur. As illustrated in FIG. 1, one solution has been to wrap a rope or sling device around the pipeline system to act as a restraint should there be a pipeline system failure.

By way of example, currently, restraint assemblies are often wrapped around the bended sections of the pipelines to hold the pipe sections together should a failure occur. U.S. Pat. No. 6,481,457, issued to Hayes et al. (the "'457 patent"), describes a safety restraint assembly for high pressure flow lines where short, rib tethers are wrapped around the pipeline near the ends of each section of pipe, and the long tethers are linked end-to-end to form a continuous spine, that is threaded through all the rib tethers. The spine is then anchored at each of its terminal ends to anchoring structures.

A continuous chain of long tethers, as disclosed in the '457 patent, that are looped together will typically result in a bulky and heavy bandage structure. Such a cumbersome, heavy and/or bulky bandage device will create handling and operation difficulties in wrapping the bandage device around the pipeline system and, in particular, in wrapping the bandage device around the bends and curves along the pipeline systems.

Moreover, where such bandage or restraint devices are manufactured using current heat resistant materials, such devices are generally heavier and bulkier because of the physical properties (i.e., density and lack of flexibility) of such heat resistant materials. Further, as is known by those skilled in the art, for many current heat resistant materials, once they are exposed to higher temperatures, the strength of such materials may be compromised after the material is cooled, which in turn reduces the strength of the material and bandage device the material is being used within. In other words, after being exposed to higher temperatures and then being cooled, the bandage device may not be able to withstand the high heat of the pipeline and high pressure as the material or fluids move through the pipelines.

One potential solution to this problem with current bandage or restraint devices is to increase the number of fibers or strands used to manufacture the restraint device or assembly. By increasing the number of fibers or strands, the bulk of the restraint device is increased, which exacerbates the handibility issues described above.

Another potential solution is to simply replace the restraint device after they may have been exposed to higher temperatures. Not only does this not address the bulk or handibility issues, such a solution is both costly and time consuming.

Accordingly, there is a need in the technology or art for bandage or restraint devices or applications that can be used with pipeline systems to maintain safety and reduce failure conditions in such pipeline systems subject to higher pressures and elevated temperatures. Specifically, there is a need for a heat resistant, high strength restraint device that is able to maintain its strength, but does not require added fibers or strands, or added weight and bulk to the restraint device.

SUMMARY OF THE INVENTION

The above noted problems, which are inadequately or incompletely addressed or resolved by the prior art, are fully addressed and resolved by the present invention as described by the following preferred embodiments. To achieve the noted and other objects, and in view of its purposes, the present invention provides a high strength, heat resistant roundsling manufactured from a composite of disparate fibers, being a blend of Para-Aramid fibers and liquid crystal polymer fibers, comprising a plurality of Para-Aramid fibers, and a plurality of liquid crystal polymer fibers, wherein the plurality of Para-Aramid fibers and the plurality of liquid crystal polymer fibers are commingled and intertwined such that the plurality of liquid crystal polymer fibers are at least in part located in between the plurality of Para-Aramid fibers.

In another preferred embodiment of the present invention, the high strength, heat resistant roundsling uses a plurality of Para-Aramid fibers within the approximate range of 30-70% of the roundsling fibers, and a plurality of liquid crystal polymer fibers respectively within the approximate range of 70-30% of the roundsling fibers.

Another preferred embodiment of the present invention, has the high strength, heat resistant roundsling using a plurality of Para-Aramid fibers within the approximate range of 55-65% of the roundsling fibers, and a plurality of liquid crystal polymer fibers respectively within the approximate range of 45-35% of the roundsling fibers.

Another aspect of the present invention is a method of manufacturing a high strength, heat resistant roundsling using a composite of disparate fibers, being a blend of Para- Aramid fibers and liquid crystal polymer fibers, comprising the step of intertwining a plurality of Para-Aramid fibers with a plurality of liquid crystal polymer fibers, wherein the plurality of Para-Aramid fibers and the plurality of liquid crystal polymer fibers are commingled and intertwined such that the plurality of liquid crystal polymer fibers are at least in part located in between the plurality of Para-Aramid fibers.

It is to be understood that both the foregoing general description and the following detailed description are exemplary, but are not restrictive, of the invention. The various embodiments of the invention will be best understood by reading the following detailed description of the several disclosed embodiments in conjunction with the attached drawings that are briefly described below.

BRIEF DESCRIPTION OF THE DRAWINGS

The features and advantages of embodiments of the present invention, and the manner of attaining them, are more apparent and the invention will be better understood by reference to the following description of embodiments taken in conjunction with the accompanying drawings, wherein corresponding reference characters indicate corresponding parts throughout the several views and wherein.

DETAILED DESCRIPTION OF THE INVENTION

Figure 1:
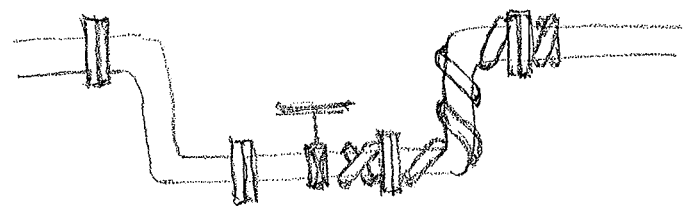
FIG. 1 shows use of an exemplary sling device to wrap a pipeline.

It is to be understood that from the following detailed description, other embodiments may be utilized and structured, and logical changes may be made in alternate aspects. Therefore, the following detailed description is not to be taken in a limiting sense, and the scope of embodiments and examples in accordance with the present invention is defined by the appended claims and all of their equivalents.

The invention is a high strength, high temperature resistant roundsling assembled from a blend or composite of fibers that are normally considered disparate and not compatible for combined use. The fibers used to manufacture the roundslings individually exhibit high strength characteristics or high temperature resistance characteristics. As combined, the fibers result in a roundsling that is especially effective for restraint or load carrying operations and applications that involve repeated or fluctuating high temperature, high load conditions.

More particularly, because the roundslings of the present invention are made from a blend of high strength and heat resistant fibers as described herein, the slings can be used to manufacture a restraint device that may be wrapped around various sections, including the bend sections, of pipeline according to any known method in the art. Such an application of the roundsling restraint device will reduce property damage or injuries that could potentially occur as part of a pipeline failure.

The roundslings according to the present invention can be made by any method known in the art. For example, U.S. Pat. No. 7,568,333, to St. Germain, provides for an apparatus for manufacturing industrial slings that is especially adapted for making roundslings, the contents of which are incorporated by reference in its entirety into this application. Further, U.S. Pat. No. 5,651,572, also to St. Germain, discloses a flexible roundsling construction that comprises a fiber optic signal strand component in a bundle of strands of endless parallel loop lifting core yarn contained inside a tubular protective cover material, the contents of which are incorporated by reference in its entirety into this application.

Similarly, U.S. Pat. No. 7,926,859, to St. Germain, discloses a method of making a sling for industrial lifting made of a load bearing core and a cover, the contents of which are incorporated by reference in its entirety into this application. Still further, U.S. Pat. No. 8,322,765, to St. Germain, provides for a sling for industrial lifting including a cover having fibers twisted in a first direction; and a load-bearing core within the cover, the core having a helical twist of a plurality of core strands, where each core strand is twisted in a second direction, the contents of which are incorporated by reference in its entirety into this application. Finally, U.S. Pat. No. 7,661,737, to St. Germain, provides a method of making a sling with a pre-failure warning indicator, the contents of which are incorporated by reference in its entirety into this application.

More generally, roundslings are most often made according to the American Society of Mechanical Engineers (ASME) American National Standard for roundslings. See Chapter 9-6 "Synthetic Roundslings: Selection, Use, and Maintenance" of ASME B30.9-2010, the contents of which are incorporated by reference in its entirety into this application.

With respect to the present invention, it is directed to the manufacture of roundslings where the core fibers of the roundsling are made of a blend or composite of blended Para-Aramid fibers along with liquid crystal polymer fibers ("LCP"). Currently, the fibers of rope structures or roundslings used for high pressure flow lines exposed to high heat conditions are traditionally made of 100% Para-Aramid fibers because such fibers exhibit high resistance to elevated temperatures. Examples of Para-Aramid fibers include, for example, products commercialized under the trade names TECHNORA®, TWARON®, and KEVLAR®. Examples of LCP fibers include products commercialized under the brand or trade name VECTRAN®.

The strength and heat resistance characteristics of the present inventive roundsling are unexpected because LCP and Para-Aramid fibers are typically not considered to be compatible fibers for blending in view of their respective different rates of elongation under load. Experience has shown that LCP fibers are weaker at higher temperatures than Para-Aramid fibers; however, LCP fibers regain their strength after being heated as compared to Para-Aramid fibers. Testing has shown that LCP fibers have greater lubricity as compared to Para-Aramid fibers, which tend to be comparatively dry. Moreover, Para-Aramid fibers are flame retardant, and are able to withstand temperatures up to approximately 800° F. From testing and experience, it is known that Para-Aramid fibers tend to weaken over time and have a high friction coefficient when placed together. In view of the high friction between like Para-Aramid fibers, testing has shown that such fibers tend to shear or break when under load, instead of moving or sliding against each other.

Figure 2:
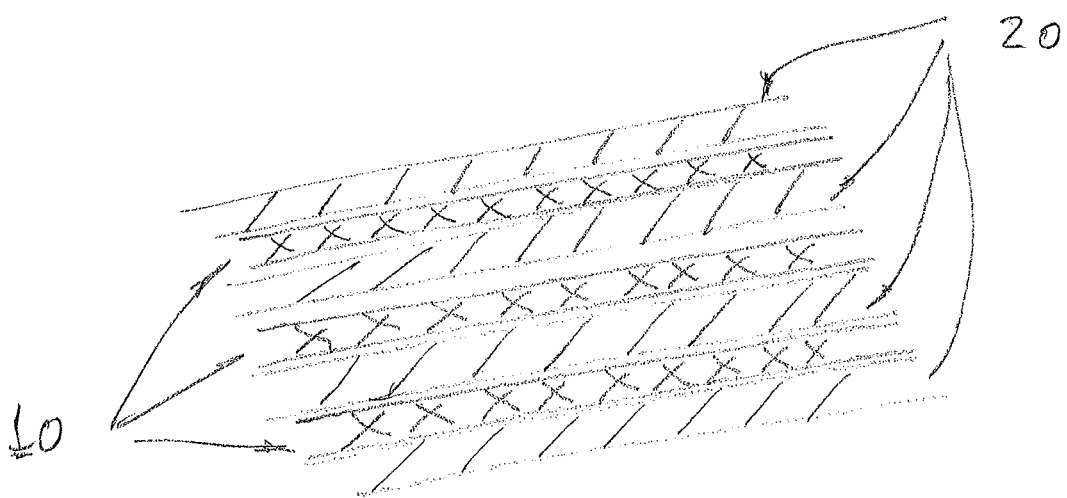
FIG. 2 illustrates the commingled Para-Aramid fibers with liquid crystal polymer fibers.

The blend of fibers used in the present inventive roundslings includes Para-Aramid fibers to increase overall heat resistance along with LCP fibers to allow the Para-Aramid fibers to adjust, or move, with respect to each other, and thereby reduce internal friction between the Para-Aramid fibers. Without LCP fibers, the higher internal friction characteristics of pure Para-Aramid fibers often results in the breakage of the Para-Aramid fibers when placed under expansion loads. Accordingly, it has been found that the presence of LCP fibers with the Para-Aramid fibers reduces the overall friction level between the fibers, and such reduced friction allows the fibers to adjust with respect to each other without causing breakage or reduction in strength. As illustrated in FIG. 2, the presence of the LCP fibers 10 in between or among the Para-Aramid fibers 20 allows the Para-Aramid fibers to more easily adjust or move with respect to each when the sling is under load. The use of LCP fibers does not appear to exhibit any reduction of the roundsling to heat resistant characteristics.

To accomplish the goals of the present inventive roundsling, preferred ranges of the fiber blend are within a range of 30-70% Para-Aramid fibers and 70-30% LCP fibers, respectively. An exemplary embodiment of the present invention that has been tested is a roundsling manufactured to include a blend of fibers within the approximate range of 55-65% Para-Aramid and 45-35% LCP. Another exemplary embodiment of the present invention includes preferred ranges of the fiber blend to be more specifically within a range of 63-67% Para-Aramid fibers and 33-37% LCP fibers, respectively. Other ratios for combinations of Para-Aramid fibers with LCP fibers are within the scope of the inventive roundslings.

Because the LCP fibers tend to be smaller in diameter than the Para-Aramid fibers, the roundsling according to the present invention results in a smaller overall diameter than a comparable roundsling manufactured from 100% Para-Aramid fibers. By way of example, in a preferred embodiment of the invention, the diameter of the roundsling is 10-20% smaller than compared to a roundsling made of 100% Para-Aramid fibers. Similarly, in another exemplary embodiment of the inventive roundsling using a combination of LCP fibers and Para-Aramid fibers, the diameter of the roundsling is approximately 15 to 18% smaller in diameter as compared to a roundsling manufactured from 100% Para-Aramid fibers.

This combination of a roundsling having a reduced diameter results in a smaller, lighter weight roundsling that is easier to work with as part of the installation and de-installation of the temporary restraint systems for pipelines as described above. More particularly, the thinner the product, the easier it is to manipulate the restraint around the bends of pipelines. Alternatively, the roundsling could contain more fibers than a 100% Para-Aramid fiber roundsling and still be of the same or lower weight of the 100% Para-Aramid fiber roundsling.

EXAMPLES

The following examples are included to more clearly demonstrate the overall nature of the inventive blended fiber roundsling. These examples are exemplary, not restrictive, of the invention.

In a first example, roundslings containing fibers as described herein according to the present invention were strength tested both before and after being subjected to a high heat environment. All slings were SP6100 with 108 strands per sling. The heated sling break tests were conducted by heating the roundslings, manufactured with fibers according to the present invention, to 250° F. for 70 hours. The roundslings were then allowed to cool, and the break strength of each roundsling was then tested. The results of the unheated and heated sling break tests are shown in tables 1 and 2, respectively, below. The unheated roundslings showed an average sling break load of 319,797 lbs. while the heated roundslings showed an average sling break load of 308,588 lbs. Therefore, the roundslings manufactured from fibers blended according to the present invention showed only a 3.5% loss in break strength after heating.

TABLE 1

UNHEATED SLING BREAK TEST

| Test Number | Weight at sling break |
| --- | --- |
| Test #1 | 317,760 lbs. |
| Test #2 | 305,680 lbs. |
| Test #3 | 339,890 lbs. |
| Test #4 | 315,860 lbs. |

TABLE 2

HEATED SLING BREAK TEST

| Test Number | Weight at sling break |
| --- | --- |
| Test #1 | 300,860 lbs. |
| Test #2 | 317,380 lbs. |
| Test #3 | 302,370 lbs. |
| Test #4 | 313,740 lbs. |

The heated roundsling break tests were also conducted by heating the roundslings, manufactured from 100% Para-Aramid fibers, to 250° F. for 70 hours. As in the above described test, the roundslings were then allowed to cool and the break strength of each roundsling was tested. The results of the unheated and heated sling break tests are shown in tables 3 and 4, respectively, below. The unheated roundslings (manufactured with 100% Para-Aramid fiber) showed an average sling break load of 286,023 lbs. while the roundslings (also manufactured with 100% Para-Aramid fiber) that were heated and then allowed to cool, showed an average sling break load of 261,323 lbs. Therefore, the roundslings manufactured from 100% Para-Aramid fiber, showed a 8.64% loss in break strength after heating.

TABLE 3

UNHEATED 100% PARA-ARAMID SLING BREAK TEST

| Test Number | Weight at sling break |
| --- | --- |
| Test #1 | 267,020 lbs. |
| Test #2 | 271,770 lbs. |
| Test #3 | 287,810 lbs. |
| Test #4 | 317,490 lbs. |

TABLE 4

HEATED 100% PARA-ARAMID SLING BREAK TEST

| Test Number | Weight at sling break |
| --- | --- |
| Test #1 | 243,040 lbs. |
| Test #2 | 253,130 lbs. |
| Test #3 | 268,440 lbs. |
| Test #4 | 280,680 lbs. |

Accordingly, the roundslings manufactured from 100% Para-Aramid fiber core strands exhibit a loss in break strength of 8.64% when exposed to a high heat environment, while the roundslings that contain fibers of combined Para-Aramid and LCP according to the present invention, showed only a 3.5% reduction in break strength after the heat exposure test.

In addition, as the results above show, roundslings made from a blend of fibers of Para-Aramid and LCP according to the present invention, exhibit a 10.6% increase in breaking strength as compared to roundslings made from fibers of 100% Para-Aramid. Additional tests have shown that roundslings made from fibers of the combination of Para-Aramid and LCP according to the present invention, similarly show a 10.6% increase in break strength as compared to roundslings made from fibers of only LCP. Therefore, the unexpected synergistic characteristics of the roundslings made from fibers of the combination of the Para-Aramid and LCP, as described herein, resulted in a substantial increase in overall performance in terms of strength, heat resistance, and also strength after exposure to extended higher temperatures.

In another example, spools containing fibers according the present invention were heated to 250° F. for 70 hours. After cooling, roundslings were manufactured from the fibers according to the present invention. The slings were six (6) feet long and contained 108 strands. The roundslings were then tested to destruction. The elongation was recorded on video and combined with the load test raw data to create a load versus strain chart. Roundslings manufactured from fibers blended according to the present invention held an average 0.9886 load vs. strain coefficient. The same experiment was conducted with spools and roundslings manufactured from 100% Para-Aramid fibers. Roundslings manufactured from 100% Para-Aramid fibers had an average of 0.8143 load vs. strain coefficient of determination. Accordingly, the roundsling manufactured from fibers blended according to the present invention showed an increase in approximately 20% in load vs. strain, as compared to roundslings made from fibers of 100% Para-Aramid, when tested to destruction.

Although illustrated and described above with reference to certain specific embodiments and examples, the present invention is nevertheless not intended to be limited to the details or examples shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed is:

1. A combination high strength, heat resistant roundsling and pipeline system, the combination comprising:
   the roundsling including a plurality of Para-Aramid fibers, and a plurality of liquid crystal polymer fibers, wherein the plurality of Para-Aramid fibers and the plurality of liquid crystal polymer fibers are commingled and intertwined such that the plurality of liquid crystal polymer fibers are at least in part located in between the plurality of Para-Aramid fibers; and
   the pipeline system including a central pipe having a first pipe portion, a first bend, a second pipe portion, a second bend and a third pipe portion, the first pipe portion and the third pipe portion extending substantially parallel relative to each other and the second pipe portion extending substantially perpendicular relative to the first and third pipe portions, the central pipe defining an elbow, the first pipe portion connected to the second pipe portion by the first bend and the second pipe portion connected to the third pipe portion by the second bend, an inlet pipe connected to the first pipe portion and an outlet pipe connected to third pipe portion, a first end of the roundsling secured to the inlet pipe and a second end of the roundsling secured to the outlet pipe, the roundsling wrapped around the central pipe, including around the first and second bends between the first and second ends.

2. The roundsling and pipeline system according to claim 1, wherein the plurality of Para-Aramid fibers is within the approximate range of 30-70% of the roundsling fibers, and the plurality of liquid crystal polymer fibers is respectively within the approximate range of 70-30% of the roundsling fibers.

3. The roundsling and pipeline system according to claim 2, wherein the roundsling manufactured from the blend of fibers loses approximately 3.5% of its break strength after being exposed to high temperatures, as compared to a roundsling manufactured from 100% Para-Aramid fibers.

4. The roundsling and pipeline system according to claim 2, wherein the roundsling is manufactured from the blend of fibers has at least an approximate 10% increase in breaking strength over a roundsling comprising 100% liquid crystal polymer fibers.

5. The roundsling and pipeline system according to claim 2, wherein the roundsling manufactured from the blend of fibers has at least an approximate 10% increase in breaking strength over a roundsling comprising 100% Para-Aramid fibers.

6. The roundsling and pipeline system according to claim 1, wherein the plurality of Para-Aramid fibers is within the approximate range of 55-65% of the roundsling fibers, and the plurality of liquid crystal polymer fibers is respectively within the approximate range of 45-35% of the roundsling fibers.

7. The roundsling and pipeline system according to claim 1, wherein the plurality of Para-Aramid fibers is within the approximate range of 63-67% of the roundsling fibers, and the plurality of liquid crystal polymer fibers is respectively within the approximate range of 37-33% of the roundsling fibers.

8. The roundsling and pipeline system according to claim 1, wherein the roundsling manufactured from the blend of fibers is approximately 17% smaller in diameter as compared to a roundsling manufactured from 100% Para-Aramid fiber.

9. The roundsling and pipeline system according to claim 8, wherein the plurality of Para-Aramid fibers is within the approximate range of 30-70% of the roundsling fibers, and the plurality of liquid crystal polymer fibers is respectively within the approximate range of 70-30% of the roundsling fibers.

10. The roundsling and pipeline system according to claim 8, wherein the plurality of Para-Aramid fibers is within the approximate range of 55-65% of the roundsling fibers, and the plurality of liquid crystal polymer fibers is respectively within the approximate range of 45-35% of the roundsling fibers.

* * * * *